W. F. JAENECKE.
CLUTCH.
APPLICATION FILED APR. 30, 1915.

1,197,028. Patented Sept. 5, 1916.

WITNESSES
Jas. K. McCathran
F. T. Chapman

Wilhelm F. Jaenecke,
INVENTOR
BY
ATTORNEY

UNITED STATES PATENT OFFICE.

WILHELM F. JAENECKE, OF NORTH TONAWANDA, NEW YORK, ASSIGNOR OF ONE-HALF TO GEORGE O. MILLER, OF NORTH TONAWANDA, NEW YORK.

CLUTCH.

1,197,028.     Specification of Letters Patent.     Patented Sept. 5, 1916.

Application filed April 30, 1915. Serial No. 25,003.

*To all whom it may concern:*

Be it known that I, WILHELM F. JAENECKE, a citizen of the United States, residing at North Tonawanda, in the county of Niagara and State of New York, have invented a new and useful Clutch, of which the following is a specification.

This invention relates to clutches, and is adapted both for use as a clutch pulley, or for use wherever a clutch, and particularly a friction clutch, is desirable.

It is the object of the present invention to provide a clutch structure wherein all parts liable to catch upon anything are eliminated, and the exterior of the clutch is circularly smooth.

In accordance with the present invention there is provided a shell which may be keyed upon a shaft, and within this shell are friction shoes carried by another member which may be either the drive or driven member, and these shoes are under the control of actuating mechanism operated by movements of certain of the actuating parts lengthwise of the shafts, the drive and driven shafts being in alinement. In the particular arrangement shown certain of the parts are separated in the direction of the length of the shafts or moved together in accordance with the coupling or uncoupling actions, and in either event no portions of the mechanism which would be liable to engage anything in the neighborhood to catch and entangle therewith are in any manner accessible. For this reason the clutch may be moved to either the clutched or unclutched position, and may be rotating at high speed without there being any projections whatever of other than circular contour described about the axis of rotation as an axis of generation.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 1:
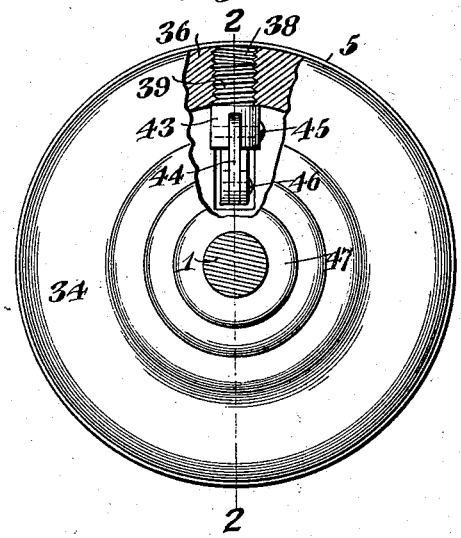
Figure 3:
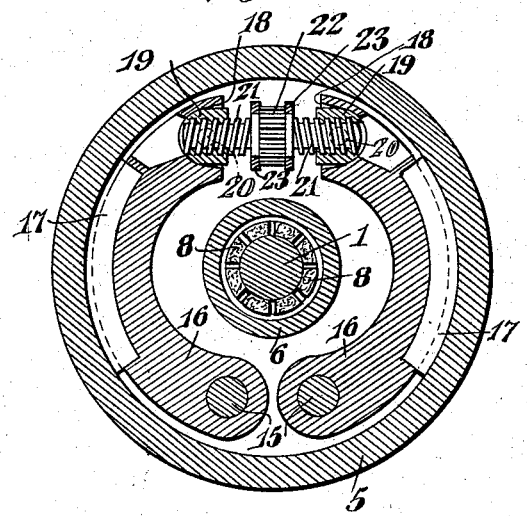
Figure 2:
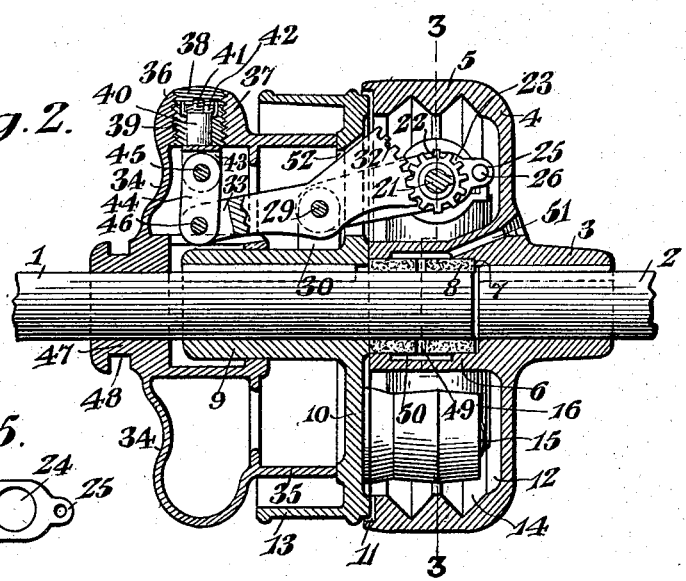
Figure 5:
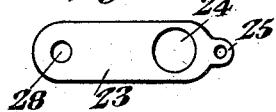
Figure 4:
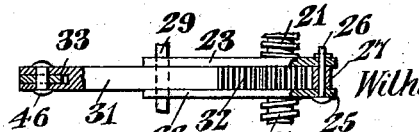

In the drawings: Figure 1 is an end elevation of the clutch structure with the shaft in cross-section and some parts broken away to disclose more distant parts. Fig. 2 is a longitudinal diametric section on the line 2—2 of Fig. 1. Fig. 3 is a section on the line 3—3 of Fig. 2. Fig. 4 is a fragmentary section showing a portion of the operating mechanism for the clutch shoes. Fig. 5 is a plan view of a link employed in the mechanism shown in Fig. 4.

Referring to the drawings there are shown two shafts 1 and 2, of which the shaft 1 may be considered as the drive shaft and the shaft 2 as the driven shaft, although it is entirely immaterial which one is the drive shaft and which one is the driven shaft so far as the operation of the clutch is concerned.

Keyed to the shaft 2 is a hub projection 3 formed of a shell 4, which latter is provided with an axially extended overhang 5 on the side remote from the hub 3. Within the overhang 5 the shell 4 has a hub extension 6 counterbored as shown at 7 to receive a bushing 8 and a corresponding portion of the adjacent end of the shaft 1.

Keyed upon the shaft 1 is a hub 9 which at one end is provided with a radial flange 10 of a diameter closely approaching that of the shell 4 and seating near its periphery in a groove 11 formed in the corresponding edge of the overhang 5. The flange 10 therefore constitutes a closure or cap plate for the corresponding end of the shell 4, thus defining within the shell 4 a chamber 12. Extending from that face of the flange 10 remote from the shell 4 is a substantially cylindrical flange 13 concentric with the shaft 1. The inner wall of the shell 4 where overhanging the hub extension 6 is formed with grooves 14 which in the particular showing of the drawings are V grooves, and are two in number, although the particular shape of the grooves or the particular number of the grooves is not obligatory.

Projecting from the flange 10 into the shell 4 are adjacent lugs or pins 15, on which are mounted corresponding ends of clutch shoes 16 each provided with wear plates or blocks 17 conforming to the grooves 14. At the end of each shoe 16 remote from its pivot support 15 the end of the shoe toward the other shoe, these shoes being of arc shape, has a countersink 18 with its inner end curved. Seated in each countersink 18 is a nut 19 with a portion curved in conformity with the respective countersink 18. The nuts are held against escape from their seats by pins or pintles 20 which, however, being disposed in the axis of rocking of the nuts, do not interfere with such rocking.

Threaded into the nuts 19 which are in approximate alinement one with the other, is a threaded rod 21 having the threads at opposite ends respectively right and left and at an intermediate point this rod carries a pinion 22. The pinion and rod are fast to each other so that when the pinion is rotating in one direction the nuts and the corresponding ends of the brake shoes are caused to approach, and when the rod is rotated in the other direction the clutch shoes are spread apart and the range of movement is sufficient to cause the clutch shoes to grip in the grooves 14 of the shell 4 or to release therefrom, as the case may be.

Applied to the rod 21 on opposite sides of the pinion 22 are flat links 23, which where traversed by the rod 21 have passages 24 therethrough. These passages are of sufficient size to offer no impediment to the rotation of the rod and are located near one end of each link 23. Beyond the passage 24 each link is formed with a short eye extension 25 matching that of the other link, and the two links are connected together by a bolt or pin 26 with an intermediate spacer 27. Near the other end each link 23 has a passage 28 therethrough traversed by a pivot pin 29 carried at the ends by ears 30 projecting from the hub 9. Mounted on the pin 29 between the links 23 is a rock lever 31 terminating adjacent to the pinion 22 in a curved rack 32 meshing with the pinion 22, while the other end of the rock arm is bifurcated, as shown at 33.

Mounted on the hub 9 which has its exterior of suitable form for the purpose, is another shell 34 of cylindrical outline with an axially extended flange 35 entering the flange 13 and capable of movement therein in the direction of the length of the axis of rotation. The shell 34 has a circular rib 36 exterior to the flange 13, and this rib at one point is thickened to form an interior boss 37 through which there is an interiorly threaded radial passage 38. Threaded into the passage 38 there is an exteriorly threaded plug 39 having a central passage in which is seated a pin 40 having at one end a threaded extension 41 to which is applied a nut 42 holding the pin 40 in the plug 39. At the end of the plug 39 toward the interior of the shell 34 the pin 40 is provided with ears 43 between which is pivoted one end of a link 44 by means of a pivot pin 45, while the other end of this link enters between the ears on the bifurcated end 33 of the rock arm 31 and is there secured by a pivot pin 46. The shell 34 is formed with a hub 47 having a circular groove 48 in its periphery for the application of the usual ring customarily supplied for the attachment of an operating lever, whereby rotating members are moved lengthwise of the shafts upon which they are mounted.

When the shell 34 is moved away from the shell 4 the link 44 has the end connected to the pivot pin 45 moved away from the arm 31, so that the link and arm approach alinement, and as the pin 44 is more distant from the axis of rotation than the pivot 29 of the arm 31, said arm is rocked in a direction to cause the gear teeth 32 to engage the pinion 22 in a manner rotating the latter. When the shell 34 is moved toward the shell 4 the contrary action takes place. In this manner the clutch shoes are moved with great force into engagement with the inner wall of the shell 4, or are moved away therefrom, as the case may be, thus either coupling the two parts of the clutch together and correspondingly coupling the shafts 1 and 2 together, or releasing one shaft from the other. However the clutch be moved, whether to the coupled or uncoupled position, and whether one or both parts of the clutch be rotating, the exterior of the clutch is entirely smooth and even where the clutch parts are extended in the direction of the length of the shafts in no instance is there any rotating part liable to come in contact with anything with which it might entangle.

The tie plates or links 23 provide means whereby the rack teeth 32 are at all times kept in mesh with the pinion 22, and even when the clutch is under the greatest strain with the parts holding the friction shoes pressed hard against the inner wall of the shell 4, the links or tie plates 23 hold the parts in the proper relation. The bushing 8 is formed with radial oil passages 49 and the interior of the hub extension 6 has a circular oil duct 50 for the distribution of lubricant to the shafts, while an oil passage 51 accessible from the exterior of the shell 4 provides for the application of lubricant as needed. Where the rock arm 31 extends through the flange 10 the latter is formed with a slot or passage 52 for the purpose. It will be understood that the size or capacity of the means for expanding and contracting the brake shoes may be varied in accordance with the size of the clutch and the load to be placed thereon.

What is claimed is:—

1. A clutch comprising a shell closed at one end and open at the other end and provided with a hub for mounting the shell on a shaft, a cap plate for the open end of the shell provided with an elongated hub for mounting the cap plate on a shaft other than that carrying the shell and also provided with a peripheral flange, both hub and flange extending away from the shell, another shell closed at the end remote from and open at the end toward the first-named shell and at the open end formed with a flange telescoping into the flange on the cap plate, and a hub telescoping on the hub of the cap plate, clutching devices carried by the cap plate in operative relation to the first-named shell, and connections between the second named shell and the clutching devices for operating them into and out of clutching position, said clutching devices and operating connections therefor being wholly inclosed in the two shells and cap plate.

2. A clutch comprising a shell closed at one end and open at the other end and provided with a hub for mounting the shell on a shaft, a cap plate for and exterior to the open end of the shell and provided with an elongated hub for mounting the cap plate on a shaft other than that carrying the shell and also provided with a peripheral flange, both hub and flange extending away from the shell, another shell closed at the end remote from and open at the end toward the first-named shell and at the open end formed with a flange telescoping into the flange on the cap plate, and a hub telescoping on the hub of the cap plate, clutching devices carried by the cap plate in operative relation to the first-named shell, and connections between the second-named shell and the clutching devices for operating them into and out of clutching position, said clutching devices and operating connections therefor being wholly inclosed in the two shells and cap plate.

3. A clutch comprising a shell of circular exterior, a cap plate closing one end of the shell and also of circular exterior with a flange extending from the cap plate in concentric relation to the axis of rotation and on the side of the cap plate remote from the shell, clutch shoes wholly within the shell and carried by the cap plate, expanding and contracting devices carried by the clutch shoes, operating devices for the expanding and contracting devices carried by the cap plate and extending therefrom on the same side of and to a greater distance than the extension of the flange on the cap plate, and another shell in telescoping relation to the flange and movable toward and from the latter and operating means for expanding and contracting the clutch shoes having parts extending into the second-named shell and connected thereto, the exterior surfaces of all the parts being of circular contour throughout.

4. In a clutch structure, the combination of a drive and a driven shaft, a shell closed at one end and open at the other end and mounted on one shaft and provided with clutch surfaces on its interior, a cap plate for and exterior to the open end of the shell and mounted on the other shaft, said plate being provided with a peripheral flange and an extended hub in concentric relation to the shaft on which the plate is mounted and both projecting in a direction away from the shell, another shell on the side of the cap plate remote from the first-named shell and provided with an extension toward the first-named shell and in concentric relation to the shaft on which the cap plate is mounted and in telescoping relation to the flange of the cap plate and also provided with a hub telescoping on the hub of the cap plate, said second shell being movable lengthwise of the hub, clutch shoes carried by the cap plate within the first shell, and operating means for the clutch shoes carried in part thereby and in part by the cap plate and provided with connections extended and attached to the second-named shell for causing the expansion and contraction of the clutch shoes by axially extended movements of the second-named shell, said clutch shoes and operating means therefor being located wholly within the confines of the shells and cap plate and the exterior portions of the clutch being of circular contour throughout.

5. A clutch structure comprising a shell with clutch surfaces, another clutch member forming a closure for the shell, clutch shoes carried by the second-named member, right and left hand screw actuating means for the clutch shoes, a pinion carried by the right and left hand screws, a rock arm carried by the second-named clutch member and provided with a rack engaging the pinion, and the tie links between the pivot of the rock arm and the pinion for holding the pinion and rack against spreading.

6. A clutch comprising a clutch member having engaging surfaces, another clutch member, clutch shoes on the second-named clutch member in operative relation to the engaging surfaces of the first-named clutch member, right and left hand screw connections for the clutch shoes for moving the latter into and out of clutching relation to the first-named clutch member, a pinion on the right and left hand screw connections, a rock arm mounted on the second-named clutch member and provided with a rack portion meshing with the pinion, an operating means for the rock arm comprising a reciprocable member, and a link connection between the reciprocable member and the rock arm for causing rocking movements of the rock arm by reciprocatory movements of the reciprocable member.

7. A clutch comprising a shell having clutch surfaces therein, a cap plate for the shell, clutch shoes each pivotally mounted at one end on the cap member with the pivot supports both on the same side of the axis of rotation, right and left hand screws connecting the other ends of the clutch shoes for moving the clutch shoes into and out of engagement with the clutch surfaces of the shell, a pinion on the right and left hand screw connections of the clutch shoes, a rock arm mounted on the cap plate and provided with a rack engaging the pinion, the rock arm having a rocking movement in a plane radial to the axis of rotation, an operating member movable lengthwise of the axis of rotation, and a link connecting the operating member and that end of the rock arm remote from the rack for causing rocking movements of the rock arm by movements of the operating member in the direction of the length of the axis of rotation.

In testimony, that I claim the foregoing as my own, I have hereto affixed my signature in the presence of two witnesses.

WILHELM F. JAENECKE.

Witnesses:
ALICE M. MILLER,
ED. W. JAENECKE.

Copies of this patent may be obtained for five cents each, by addressing the "Commissioner of Patents, Washington, D. C."